US009088622B2

(12) United States Patent
Erbe

(10) Patent No.: US 9,088,622 B2
(45) Date of Patent: Jul. 21, 2015

(54) DYNAMIC CLIENT REGISTRATION FOR SERVER PUSH EVENTS IN LONG POLLING SCENARIOS

(75) Inventor: Lars Erbe, Stutensee (DE)

(73) Assignee: SAP SE, Walldorf (DE)

(*) Notice: Subject to any disclaimer, the term of this patent is extended or adjusted under 35 U.S.C. 154(b) by 388 days.

(21) Appl. No.: 13/542,035

(22) Filed: Jul. 5, 2012

(65) Prior Publication Data

US 2014/0012997 A1  Jan. 9, 2014

(51) Int. Cl.
*H04L 29/08* (2006.01)

(52) U.S. Cl.
CPC .................................. *H04L 67/26* (2013.01)

(58) Field of Classification Search
CPC ........................................................ G06F 15/16
USPC .................................. 709/228, 246, 220, 227
See application file for complete search history.

(56) References Cited

U.S. PATENT DOCUMENTS

| | | | |
|---|---|---|---|
| 6,535,855 B1* | 3/2003 | Cahill et al. | 705/346 |
| 8,751,639 B2* | 6/2014 | Griffiths | 709/224 |
| 8,782,127 B2* | 7/2014 | Addala et al. | 709/203 |
| 2009/0024648 A1 | 1/2009 | Heix et al. | |
| 2012/0166976 A1 | 6/2012 | Rauh et al. | |
| 2012/0167016 A1 | 6/2012 | Rauh et al. | |
| 2012/0167178 A1 | 6/2012 | Rauh et al. | |

OTHER PUBLICATIONS

U.S. Appl. No. 13/212,641, filed Aug. 18, 2011, Said et al.

* cited by examiner

*Primary Examiner* — Ario Etienne
*Assistant Examiner* — Sahera Halim
(74) *Attorney, Agent, or Firm* — Fish & Richardson P.C.

(57) ABSTRACT

The disclosure generally describes computer-implemented methods, software, and systems for modeling and deploying decision services. One computer-implemented method includes establishing a push-channel session uniquely associated with a client, wherein the push channel session communicates with the client using a single push channel. The computer-implemented method further includes registering the established push-channel session with a messaging channel runtime creating a client-specific messaging channel and registering a backend application with the push-channel-session-associated single push channel using a push channel registration session. The method further includes, responsive to an application message received from an application session associated with the backend application using a client-specific application channel, dispatching the received application message to the push-channel session from the messaging channel runtime using the client-specific messaging channel. The method includes communicating the dispatched application message to the client using the single push channel.

23 Claims, 3 Drawing Sheets

DYNAMIC CLIENT REGISTRATION FOR SERVER PUSH EVENTS IN LONG POLLING SCENARIOS

BACKGROUND

Web-based applications are applications that may be accessed over a network such as the Internet. With the rising popularity of the Internet, web-based applications provide developers and content providers a number of advantages. For example, web-based applications allow the primary processing responsibilities associated with the application's functionality to be handled at the server. As a result, a client with limited processing capabilities may still access and benefit from the functionality of processing-intensive applications. Moreover, web-based applications are much easier to update because the updates take place on the host server, foregoing the need to update software at each client.

There are numerous methods by which a client may send data to and receive data from a web-based application. For example, a web-based application may notify a client of new events using a push service. A push service allows the server to initiate communication with the client, as opposed to a traditional pull service in which the client must initiate communications. Using push services, a server may immediately send new events to a client, as opposed to waiting for a client request for the data. Long polling is one method for implementing push functionality. In long polling, a client makes a request for data from the server, but instead of responding immediately, the server holds the request until there is a new event about which the server needs to notify the client. Once the client receives a response regarding the new event, it can immediately make another request for data so that there is always a pending request to which the server may respond with new event data.

SUMMARY

The present disclosure relates to computer-implemented methods, software, and systems for dynamic client registration for server push events in long polling scenarios. One computer-implemented method includes establishing a push-channel session uniquely associated with a client, wherein the push channel session communicates with the client using a single push channel. The computer-implemented method further includes registering the established push-channel session with a messaging channel runtime creating a client-specific messaging channel and registering a backend application with the push-channel-session-associated single push channel using a push channel registration session. The method further includes, responsive to an application message received from an application session associated with the backend application using a client-specific application channel, dispatching the received application message to the push-channel session from the messaging channel runtime using the client-specific messaging channel. The method includes communicating the dispatched application message to the client using the single push channel.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by a data processing apparatus, cause the apparatus to perform the actions.

The foregoing and other implementations can each optionally include one or more of the following features: the single push channel may be implemented using at least one of long polling or web sockets. The registration using the push channel registration session may be performed on the messaging channel runtime and the push session. Prior to the registration, the push channel registration session may receive at least one of a registration or a de-registration request for the backend application. The computer-implemented method may further include, prior to receiving the application message associated with the application session, registering the client-specific application channel between the application session and the messaging channel runtime. The messaging channel runtime may dispatch the received application message using the client-specific messaging channel corresponding to the client associated with the application channel. The communicated application message may be dispatched by a client push dispatcher to the client application associated with the application session.

The subject matter described in this specification can be implemented in particular implementations so as to realize one or more of the following advantages. First, the dynamic event registration prevents a server from sending data regarding all events to the client and forcing the client to sort through the data to determine what data is relevant. Second, the described dynamic registration processes and systems facilitate the use of a single long polling connection to service all applications with which the client may interface, as opposed to a connection for each application. Third, the described dynamic registration processes and systems extend dynamic registration functionality to clients that do not support full-duplex push connections (e.g., WebSocket or server-side events).

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

This disclosure generally describes computer-implemented methods, software, and systems for dynamic client registration for server push events. Specifically, the computer-implemented methods, software, and systems may utilize long polling to send application messages from a server to a client.

For the purposes of this disclosure, long polling is a technique by which a client makes a request for data from a server, but instead of responding immediately, the server holds the request open until there is a new event about which the server needs to notify the client. Once the client receives a response regarding the new event, it can immediately make another request for data so that there is always a pending request to which the server may respond with new event data. Though the following description sets forth systems and processes that utilize long polling, the described systems and processes may be applied to other unidirectional communication methods for implementing push functionality. For example, the systems and processes described herein may be applied to pushlets, where the server holds a response to a client's browser request "open" and sends events to the client as code (e.g., segments of JavaScript) that the browser may use to update its display.

Figure 1:
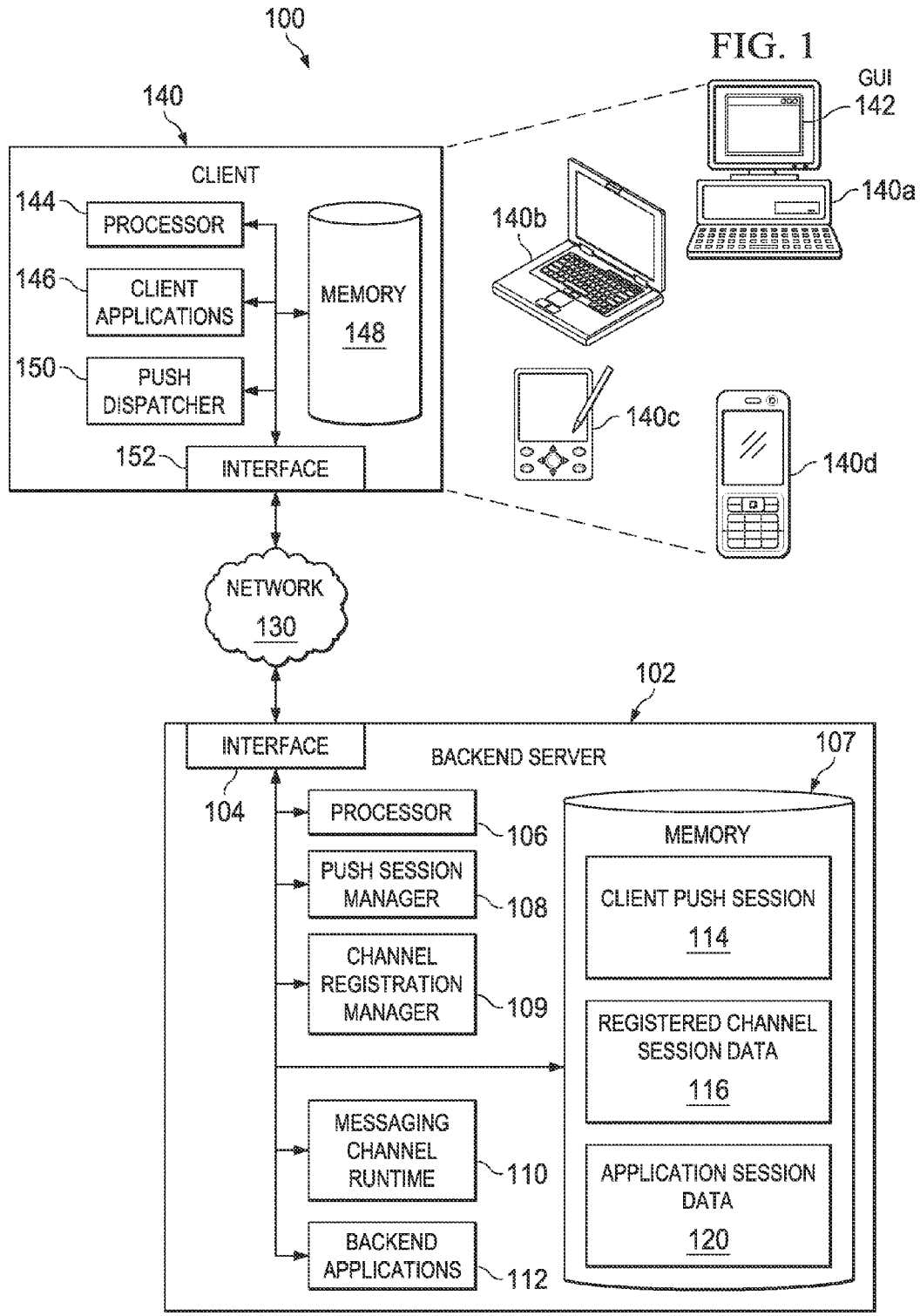
FIG. 1 is a block diagram illustrating an example system for dynamic client registration for server push events in long polling scenarios.

FIG. 1 illustrates an example distributed computing system 100 for dynamic client registration for server push events in long polling scenarios. At a high-level, the illustrated example distributed computing system 100 includes or is communicably coupled with an enterprise server 102 and clients 140a-140c (collectively client 140) that communicate across a network 130. The enterprise server 102 comprises a computer operable to receive, transmit, process, store, or manage data and information associated with the example distributed computing system 100. In general, the enterprise server 102 is a server that stores a push session manager 108, a channel registration manager 109, a messaging channel runtime 110, and backend applications 112 where at least a portion of the push session manager 108, channel registration manager 109, messaging channel runtime 110, and/or backend applications 112 is executed using requests and responses received from and sent to a client 140 within and communicably coupled to the illustrated example distributed computing system 100 across network 130. The push session manager 108, channel registration manager 109, messaging channel runtime 110, and/or backend applications 112 are used to dynamically register a client for server push events. In some implementations, the enterprise server 102 may store a plurality of various push session managers 108, channel registration managers 109, messaging channel runtimes 110, and/or backend applications 112. In other implementations, the enterprise server 102 may be a dedicated server meant to store and execute only a single push session manager 108, channel registration manager 109, messaging channel runtime 110, and/or backend application 112. In still other implementations, the enterprise server 102 can store and execute none, a single instance, and/or a plurality of the push session manager 108, channel registration manager 109, messaging channel runtime 110, and/or backend applications 112. In some implementations, the enterprise server 102 may comprise a web server, where the push session manager 108, channel registration manager 109, messaging channel runtime 110, and/or backend applications 112 represent one or more web-based applications accessed and executed by the client 140 using the network 130 or directly at the enterprise server 102 to perform the programmed tasks or operations of the push session manager 108, channel registration manager 109, messaging channel runtime 110, and/or backend applications 112.

Specifically, the enterprise server 102 is responsible for receiving application requests, for example, requests for creating a push channel and dynamic registration for server events, from one or more client applications associated with the client 140 of the example distributed computing system 100 and responding to the received requests by processing said requests in the associated push session manager 108, channel registration manager 109, messaging channel runtime 110, and/or backend applications 112, and sending an appropriate response from the push session manager 108, channel registration manager 109, messaging channel runtime 110, and/or backend applications 112 back to the requesting client application. In addition to requests from the client 140, requests associated with the push session manager 108, channel registration manager 109, messaging channel runtime 110, and/or backend applications 112 may also be sent from internal users, external or third-party customers, other automated applications, as well as any other appropriate entities, individuals, systems, or computers. According to one implementation, enterprise server 102 may also include or be communicably coupled with an e-mail server, a web server, a caching server, a streaming data server, and/or other suitable server. In other implementations, the enterprise server 102 and related functionality may be provided in a cloud-computing environment.

The enterprise server 102 includes an interface 104. Although illustrated as a single interface 104 in FIG. 1, two or more interfaces 104 may be used according to particular needs, desires, or particular implementations of the example distributed computing system 100. The interface 104 is used by the enterprise server 102 for communicating with other systems in a distributed environment—including within the example distributed computing system 100—connected to the network 130; for example, the client 140 as well as other systems communicably coupled to the network 130 (not illustrated). Generally, the interface 104 comprises logic encoded in software and/or hardware in a suitable combination and operable to communicate with the network 130. More specifically, the interface 104 may comprise software supporting one or more communication protocols associated with communications such that the network 130 or interface's hardware is operable to communicate physical signals within and outside of the illustrated example distributed computing system 100.

The enterprise server 102 includes a processor 106. Although illustrated as a single processor 106 in FIG. 1, two or more processors may be used according to particular needs, desires, or particular implementations of the example distributed computing system 100. Generally, the processor 106 executes instructions and manipulates data to perform the operations of the enterprise server 102. Specifically, the processor 106 executes the functionality required to receive and respond to requests from the client 140, including, but not limited to, requests for creating a push channel and requests for dynamic registration for server events.

The push session manager 108 is a service or a stand-alone application that establishes and maintains a push session between the client 140 and the enterprise server 102. The push session manager 108 receives a message from clients 140 to initiate a push session. In some implementations, clients 140 may establish a long-polling-type push session by sending a request to the push session manager 108 to establish a push session. The push session manager 108 may associate the request with a unique identifier in order to track the push session. In some implementations, the unique identifier is supplied by the client 140 as part of the request to establish a push session. In other implementations, the unique identifier may be created and assigned by the push session manager 108 upon receipt of the request from the client 140. In either case, the push session manager 108 associates the unique identifier with the request from the client 140, which it holds until the push session manager 108 receives a message to forward to the client 140.

Generally, the push session manager 108 maintains push sessions between the client 140 and the enterprise server 102.

In some implementations, the push session manager 108 receives messages from the backend applications 112 via the messaging channel runtime 110. However, the push session manager 108 may receive messages from any component of the enterprise server 102. The push session manager 108 forwards each received message to those clients 140 that are registered to receive messages from the backend applications 112 (or other component) that sent the message. When a push session is implemented utilizing the long-polling technique, the push session manager 108 receives from the messaging channel runtime 110 an application-specific message associated with a specific push session. In some implementations, for example, the push session manager 108 will receive from the messaging channel runtime 110 an application-specific message along with the unique identifier of a client 140 that is registered to receive the message. The push session manager 108 will then forward the message to the client 140 associated with the unique identifier by, for example, responding to a request of the client 140 currently being held by the push session manager 108 as part of the push session.

In other implementations, the push session manager 108 may be structured in any manner to establish and maintain push sessions with one or more clients and utilize these push sessions to forward messages to the proper client(s). For example, in some implementations, the push session manager 108 may maintain a separate push session process or thread for each client 140 that has requested to establish a push session. Each separate push session process or thread may have its own interface through which messages may be received. Thus, an individual push session process or thread associated with a specific client 140 may, for example, receive a message from the messaging channel runtime 110 and forward this message to the specific client 140 with which the individual push session process or thread is associated. In other words, a component of the enterprise server 102 (in this case, the messaging channel runtime 110) may manage the client(s) to which any given message should be sent. Thus, by virtue of receiving the message from the messaging channel runtime 110, the individual push session process or thread may assume that the specific client 140 has registered to receive that message.

After receiving a request from a client 140 to establish a push session, the push session manager 108 may forward information associated the established push session to the messaging channel runtime 110. For example, the push session manager 108 may forward the unique identifier associated with the client 140 and an indication that the client 140 has requested to establish a push session. Additionally or alternatively, the push session manager 108 may provide information regarding the push session established for the client 140. For example, in implementations where the push session manager 108 maintains a separate push session process or thread for each client 140, the push session manager 108 may provide the messaging channel runtime 110 with an identifier for the separate push session process or thread associated with the client 140 that requested a push session be created.

Though the push session manager 108 has been described primarily as establishing and maintaining long-polling-type push channels with clients 140, the push session manager 108 may be configured to establish and maintain any channel of communication with a client 140 that enables the push session manager 108 to "push" messages or other forms of communication from the enterprise server 102 to the client 140. Moreover, information regarding each push session created and maintained by the push session manager 108 may be stored in memory 107 as client push session data 114. In some implementations, for example, client push session data 114 may include one or more unique identifiers identifying the clients 140 for which the push session manager 108 received requests to create a push session and for which the push session manager 108 is currently holding a long polling request.

The channel registration manager 109 is a service or a stand-alone application that receives requests from clients 140 to register for messages or other communications from specific backend applications 112. In some implementations, the channel registration manager 109 may receive a message from a client 140 that includes a unique identifier associated with the client 140 along with an identifier associated with the application for which the client 140 is registering.

As described above, when using long polling, a client 140 issues a request that is held by the enterprise server 102 until there is data that the server needs to "push" to the client 140. The client 140 receives the response with the data and immediately renews the long polling request to the enterprise server 102, as long as the client 140 desires to receive data. In other words, for every long polling request, the client 140 may have only one opportunity (i.e., with the request itself) to provide information through the long polling channel to the enterprise server 102, until the client 140 sends another request to renew the long polling session. Thus, in one implementation, the client 140 could send a push request for each backend application 112 from which the client 140 desires to receive messages. However, this would require the enterprise server 102 and the client 140 to maintain separate communication channels for each backend application 112 from which the client 140 desires to receive messages.

Alternatively, in another implementation, the client 140 could send a single push request that includes an indication of all backend applications 112 from which the client 140 desires to receive messages. However, in this alternative implementation, the client 140 would be required to know, in advance, all of the backend applications 112 from which the client 140 desires to receive messages. Moreover, the client 140 would have no way, through the established long polling channel, to opt out of receiving messages from a backend application 112 with which the client 140 registered, until the client 140 has an opportunity to renew the long polling request.

The channel registration manager 109 provides another alternative for implementing dynamic registration and deregistration for messages from multiple backend applications 112 using a single long-polling-type push session. Specifically, the channel registration manager 109 may receive one or more registration/deregistration requests from a client 140 separate from an established push channel associated with the client 140 and maintained by the push session manager 108. The registration/deregistration requests received by the channel registration manager 109 may identify the client 140 and one or more backend applications 112 from which the client 140 desires to receive or no longer receive messages. In some implementations, the client 140 may be identified by the unique identifier assigned to the client 140 during establishment of the push session and the one or more backend applications 112 may be identified by an identifier than uniquely identifies each backend application 112. In some implementations, the registration/deregistration requests received by the channel registration manager 109 may take the form of an HTTP PUT request from a client 140 that identifies the client 140 and the one or more backend application 112 from which the client 140 desires to receive messages. However, the requests received by the channel registration manager 109 may be in any suitable format.

In some implementations, the channel registration manager 109 sends information regarding the registration requests it receives from clients 140 to the messaging channel runtime 110. Additionally, the channel registration manager 109 may store information regarding the registration requests it receives from clients 140 in memory 107 as registered channel session data 116. In some implementations, for example, the registered channel session data 116 may include an association between one or more clients 140 and the one or more backend applications 112 from which each of the one or more clients 140 register to receive messages. Moreover, when the channel registration manager 109 receives a deregistration request that identifies one or more backend applications 112 from which a client 140 no longer desires to receive messages, the channel registration manager 109 may be configured to remove from registered channel session data 116 the identified one or more backend applications 112 from a list of backend applications 112 from which the client 140 is registered to receive messages.

The messaging channel runtime 110 is a service or a stand-alone application that receives messages from the backend applications 112 and determines to which clients 140 the messages should be sent. Specifically, the messaging channel runtime 110 receives a message from a backend application 112 and determines, based on the information regarding the push sessions received from the push session manager 108 and the information regarding the registration requests received from the channel registration manager 109, to which push session(s) to send the message.

In some implementations, for example, when the messaging channel runtime 110 receives a message from a first backend application 114, the messaging channel runtime 110 may be configured to access registered channel session data 116 stored in memory 107 to determine which clients 140 have registered to receive messages from the first backend application 114. Based on the determination, the messaging channel runtime 110 may forward the message to the push session manager 108 along with an indication of which clients 140 are to receive the message. For example, in some implementations, the messaging channel runtime 110 may send to the push session manager 108 the message received from the first backend application 114 and a list of unique identifiers associated with those clients 140 from which the channel registration manager 109 received registration requests regarding the first backend application 114. Alternatively, in some implementations, the messaging channel runtime 110 may be configured to directly send a copy of the message received from the first backend application 114 to each of the push session processes or threads associated with the clients 140 from which the channel registration manager 109 received registration requests regarding the first backend application 114.

While the push session manager 108, channel registration manager 109, and messaging channel runtime 110 have been described as separate services or stand-alone applications, they may be combined into one or more services or stand-alone applications in any combination. Thus, a single service or stand-alone application may implement all or some subset of the functionality of the push session manager 108, channel registration manager 109, and messaging channel runtime 110.

The one or more backend applications 112 may include any type of applications that would have a need to push information to one or more clients 140. In some implementations, for example, the one or more backend applications 112 may include web-based applications hosted on the enterprise server 102 that the one or more clients 140 may access. The one or more clients 140 may send information to and request information from the one or more backend applications 112 using standard application protocols (e.g., GET and PUT HTTP requests). However, the one or more backend applications 112 may require a separate means by which the server 102 can send information to the one or more clients 140, in addition to the standard response to a client request. Thus, each of the one or more backend applications 112 may be configured to send messages to messaging channel runtime 110 so that these messages may be forwarded to the proper clients 140. In other words, the one or more backend applications 112 may utilize the push session manager 108, channel registration manager 109, and messaging channel runtime 110 to notify clients 140 of, for example, aperiodic events in real-time.

The one or more backend applications 112 may store application session data 120 in memory 107. Application session data 120 may include, for example, any information necessary to execute the one or more backend applications 112. Thus, the application session data 120 may include, for example, any information received from clients 140, any data regarding which clients 140 request processing, and any information returned to the clients 140. Application session data 120 may further include a list of unique identifiers for each of the one or more backend applications 112, which the one or more backend applications 112 may append to any message sent to messaging channel runtime 110.

The client 140 may be any computing device operable to connect to or communicate with at least the enterprise server 102 using the network 130. In general, the client 140 comprises a computer operable to receive, transmit, process, and store any appropriate data associated with the example distributed computing system 100.

The illustrated client 140 further includes a client application 146. The client application 146 may be any type of application that allows the client 140 to request and view content on the client 140. In some implementations, the client application 146 can be and/or include a web browser. In some implementations, the client application 146 can use parameters, metadata, and other information received at launch to access a particular set of data from the server 102. In some implementations, the client application 146 may provide an interface to one or more corresponding backend applications 112 associated with the enterprise server 102. Once a particular client application 146 is launched, a user may interactively process a task, event, or other information associated with the enterprise server 102. Further, although illustrated as a single client application 146, the client application 146 may be implemented as multiple client applications in the client 140.

The illustrated client 140 further includes an interface 152, a processor 144, and a memory 148. The interface 152 is used by the client 140 for communicating with other systems in a distributed environment—including within the example distributed computing system 100—connected to the network 130; for example, the enterprise server 102 as well as other systems communicably coupled to the network 130 (not illustrated). The interface 152 may also be consistent with the above-described interface 104 of the enterprise server 102 or other interfaces within the example distributed computing system 100. The processor 144 may be consistent with the above-described processor 106 of the enterprise server 102 or other processors within the example distributed computing system 100. Specifically, the processor 144 executes instructions and manipulates data to perform the operations of the client 140, including the functionality required to send requests to the enterprise server 102 and to receive and process responses from the enterprise server 102. The memory 148 may be consistent with the above-described memory 107 of the enterprise server 102 or other memories within the example distributed computing system 100 but storing objects and/or data associated with the purposes of the client 140.

Further, the illustrated client 140 includes a GUI 142. The GUI 142 interfaces with at least a portion of the example distributed computing system 100 for any suitable purpose, including generating a visual representation of a web browser. In particular, the GUI 142 may be used to view and navigate various web pages located both internally and externally to the enterprise server 102. Generally, through the GUI 142, an enterprise server 102 user is provided with an efficient and user-friendly presentation of data provided by or communicated within the example distributed computing system 100.

Further, the illustrated client 140 may include a push dispatcher 150. The push dispatcher 150 is a service or a stand-alone application that establishes and maintains push sessions with an enterprise server 102, registers and deregisters for messages from specific backend applications 112, and distributes messages received from the enterprise server 102 to the proper client application(s) 146. Specifically, the push dispatcher 150 may be configured to receive a request from one or more client applications 146 to set up a push session to receive information from one or more backend applications 112 on enterprise server 102. As a result, the push dispatcher 150 may send a request to establish a push channel or session to push session manager 108. In the case where the push dispatcher 150 utilizes long polling to establish push sessions with the enterprise server 102, the push dispatcher 150 establishes a push session by sending a request to the push session manager 108 that identifies the client 140. The push dispatcher 150 then waits for a response from the push session manager 108. The response may include a message from a backend application 112 and an identifier of the backend application 112. The push dispatcher 150 may be configured to forward the received messages to those client applications 146 that have requested to receive messages from the backend application 112.

As the information requirements of the one or more client applications 146 differ, the push dispatcher 150 may register to receive and deregister to prevent receiving messages from the one or more client applications 146 by sending registration and deregistration requests, respectively, to the channel registration manager 109. Moreover, the push dispatcher 150 may store associations between client applications 146 and the one or more backend applications 112 from which a client applications 146 has requested to receive messages. Once the client 140 no longer requires the push session, the push dispatcher 150 may close the push session with enterprise server 102. In implementations where the push session utilizes long polling, for example, the push dispatcher 150 may be configured to close a push session by failing to renew the long polling request with the push session manager 108. Additionally or alternatively, the push dispatcher 150 may be configured to close a push session by sending a message to one or more components of the enterprise 102 indicating that the push session should be terminated.

By dynamically registering and deregistering for messages with the enterprise server 102, the work of deciding which messages are relevant to a client 140 is offloaded to the enterprise server 102. Moreover, bandwidth associated with communicating the messages from the enterprise server 102 to the client 140 may be conserved, because irrelevant messages (i.e., those for which the client 140 has not registered) are never sent.

There may be any number of clients 140 associated with, or external to, the example distributed computing system 100. For example, while the illustrated example distributed computing system 100 includes one client 140 communicably coupled to the enterprise server 102 using network 130, alternative implementations of the example distributed computing system 100 may include any number of clients 140 suitable to the purposes of the example distributed computing system 100. Additionally, there may also be one or more additional clients 140 external to the illustrated portion of the example distributed computing system 100 that are capable of interacting with the example distributed computing system 100 using the network 130. Further, the term "client" and "user" may be used interchangeably as appropriate without departing from the scope of this disclosure. Moreover, while the client 140 is described in terms of being used by a single user, this disclosure contemplates that many users may use one client, or that one user may use multiple clients.

The illustrated client 140 is intended to encompass any computing device such as a desktop computer, laptop/notebook computer, wireless data port, smart phone, personal data assistant (PDA), tablet computing device, one or more processors within these devices, or any other suitable processing device. For example, the client 140 may comprise a computer that includes an input device, such as a keypad, touch screen, or other device that can accept user information, and an output device that conveys information associated with the operation of the enterprise server 102 or the client 140 itself, including digital data, visual information, or a GUI 142, as shown with respect to the client 140. Additionally or alternatively, each client 140 may represent an instance of an application executed by a computing device. For example, in some implementations, each client 140 may represent a single instance of a web-browser application being executed on one or more computing devices. Thus, a computing device may be associated with more than one client 140.

Figure 2:
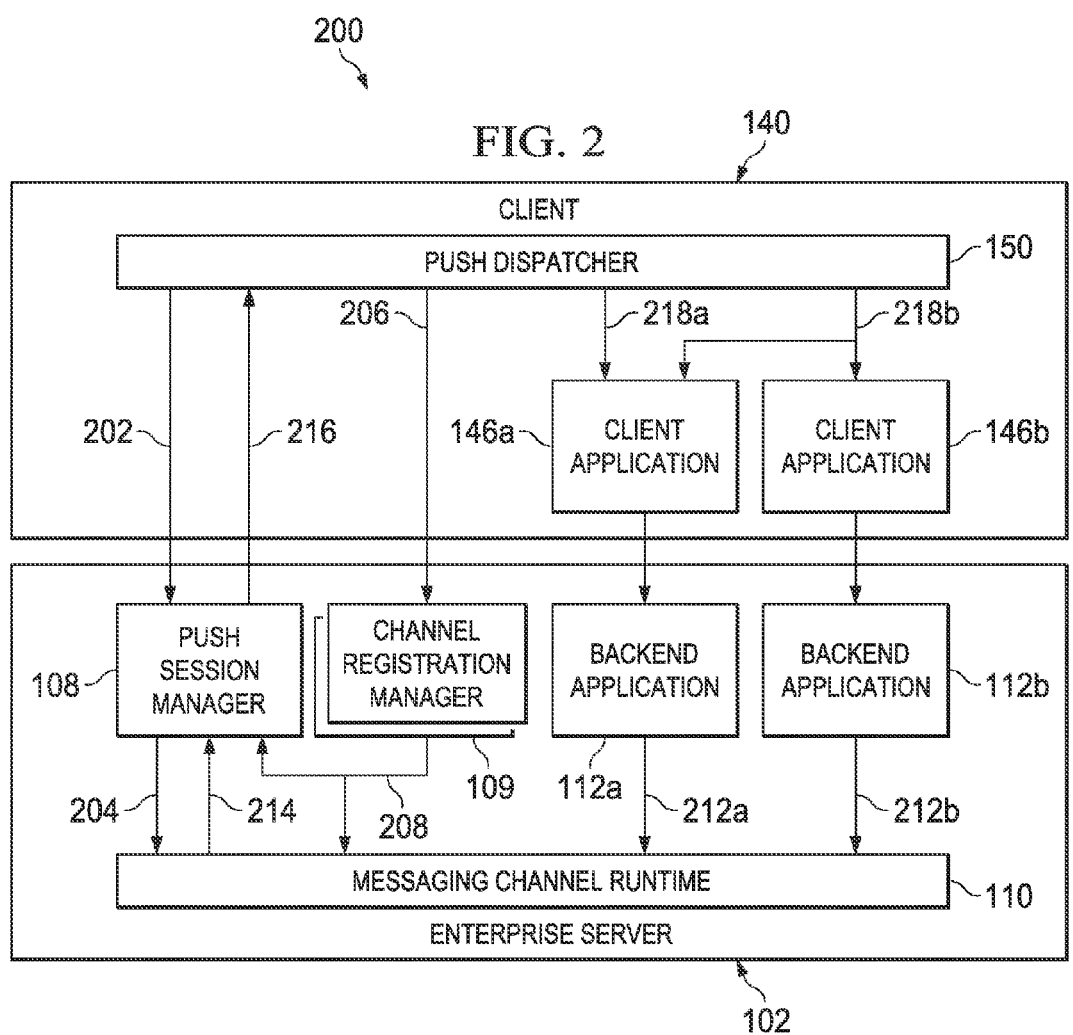
FIG. 2 is a block diagram illustrating an example series of communications that may be exchanged between various components of a server and a client for dynamic client registration for server push events.

Turning now to FIG. 2, FIG. 2 is a block diagram illustrating an example series of communications that may be exchanged between various components of an enterprise server and a client for dynamic client registration for server push events. FIG. 2 will be described with regard to the components described above with regard to FIG. 1. Therefore, certain description of previously introduced components may be omitted for brevity in the discussion of FIG. 2. However, the use of any components in describing FIG. 2 should not be viewed as limiting. The series of messages described with regard to FIG. 2 may be adapted for use by any server and client system, where the server and/or the client may omit certain components described in FIGS. 1 and 2 and/or include additional components. Moreover, the various communications shown in FIG. 2 may be occur in any logical order and may represent, for example, the setting of one or more variables, the execution of one or more functions, and/or the exchange of information between objects, processes, services, or applications.

As shown in FIG. 2, push dispatcher 150 of client 140 sends a request 202 to push session manager 108 of enterprise server 102 to establish a push session or channel between client 140 and enterprise server 102. In some implementations, the request 202 may be a long polling request that identifies the client 140 from the request 202 is being sent. In response to receiving the request 202, the push session manager 108 may create client push session data 114 that includes an association between the client 140 and the long polling request being held by the push session manager 108.

The push session manager 108 forwards data 204 to messaging channel runtime 110 indicating the creation of the push channel between client 140 and the enterprise server 102. The data 204 may include, for example, a unique identifier provided by or created for the client 140 during the establishment of the push session. In some implementations, the messaging channel runtime 110 may use the data 204 to create a list of clients to which messages from backend applications 112a and 112b must be forwarded.

Simultaneous with or subsequent to sending the request 202, the client 140 may send a registration request 206 to the channel registration manager 109 indicating one or more backend applications from which the client 140 (and more specifically the client applications 146a and 146b) desires to receive messages. In some implementations, the registration request 206 may include the unique identifier associated with the client 140 during the establishment of the push session and an identifier for each of the backend applications from which the client 140 desires to receive messages. For example, the registration request 206 may include identifiers for each of backend application 112a and backend application 112b.

The channel registration manager 109 may forward the information 208 received in registration request 206 to the messaging channel runtime 110 and/or the push session manager 108. In some implementations, for example, the messaging channel runtime 110 may be configured use the information 208 received in registration request 206 to update a list of backend applications from which the client 140 desires to receive messages.

The backend applications 112a and 112b may send messages 212a and 212b, respectively, to the messaging channel runtime 110. Based on the data 204 indicating the creation of the push channel between client 140 and the enterprise server 102 and the information 208 received in registration request 206, the messaging channel runtime 110 determines which, if any, clients have registered to receive the messages 212a and 212b. For example, if client 140 sent a registration request 206 requesting to receive messages only from backend application 112a, the messaging channel runtime 110 may determine that message 212a should be sent to client 140, but not message 212b.

Based on the determination of which, if any, clients have registered to receive the message, the messaging channel runtime 110 sends to push session manager 108 information 214 regarding any messages received from a backend application and for which one or more clients have been determined to be registered. For example, if client 140 registers to receive messages from both backend application 112a and backend application 112b, the messaging channel runtime 110 sends information regarding each of messages 212a and 212b to push session manager 108 with an indication that client 140 registered to receive each of the messages 212a and 212b. In some implementations, the information 214 sent by the messaging channel runtime 110 to the push session manager 108 regarding the received messages may include, for each received message, a list of unique identifiers associated with each of the clients registered to receive the message. Alternatively, in some implementations, the messaging channel runtime 110 may be configured to send information 214 regarding a received message directly to one or more push session processes or threads associated with those clients registered to receive the message.

Upon receiving information 214 from messaging channel runtime 110, the push session manager 108 creates one or more responses 216 to those clients that have registered to receive the application messages included in information 214. Specifically, in a case where a push session utilizes long polling, the push session manager 108 may create a response to the held long polling request associated with a client that registered to receive the message included in information 214. In some implementations, each response 216 may include a copy of the message and an indication of the backend application that sent the message. For example, if client 140 registered to receive messages from backend application 112a, the push session manager 108 (or the push session process or thread associated with the client 140) may create a response 216 that includes a copy of the message 212a and an indication that the message originated from backend application 112a.

In cases where the information 214 includes information regarding more than one message, or where the push session manager 108 receives multiple instances of information 214 for different messages close in time, the push session manager 108 may be configured to handle the multiple requests to ensure that a copy of message is sent to every client that registered to receive the message. For example, in a case where information 214 includes information regarding both messages 212a and 212b, the push session manager 108 may create, for each client registered to receive both messages, a single response 216 that includes both messages. Additionally or alternatively, the push session manager 108 may be configured to create a first response 216 corresponding to message 212a and a second response 216 corresponding to message 212b. The push session manager 108 may send the first and second responses separately by, for example, responding to a held long polling request associated with client 140 with the first response and waiting until the client 140 sends another long polling request to respond with the second response.

When the push dispatcher 150 receives the response(s) 216 including copies of the messages 212a and 212b, the push dispatcher 150 forwards the messages to the client application to which the message corresponds. Each message received from the enterprise server 102 may be associated with one or more client applications. Different messages may be associated with different client applications. In some implementations, the push dispatcher 150 is configured to access the response 216 to determine to which client applications a message should be forwarded. To determine to which client application(s) a message should be forwarded, the push dispatcher 150 may store a table or other data structure that lists which client applications should receive messages from which backend applications.

For example, where a response 216 includes message 212a and an indication that the message was sent by backend application 112a, the push dispatcher 150 may access a table that indicates copies of all messages sent by backend application 112a should be forwarded to client application 146a. As a result, the push dispatcher 150 may forward a copy 218a of the message 212a to the client application 146a. Similarly, where a response 216 includes message 212b and an indication that the message was sent by backend application 112b, the push dispatcher 150 may access a table that indicates copies of all messages sent by backend application 112b should be forwarded to both client application 146a and client application 146b. As a result, the push dispatcher 150 may forward copies 218b of the message 212b to each of client application 146a and client application 146b. Client application 146a and client application 146b may process or otherwise handle the copies 218a and 218b of messages 212a and 212b accordingly.

Figure 3:
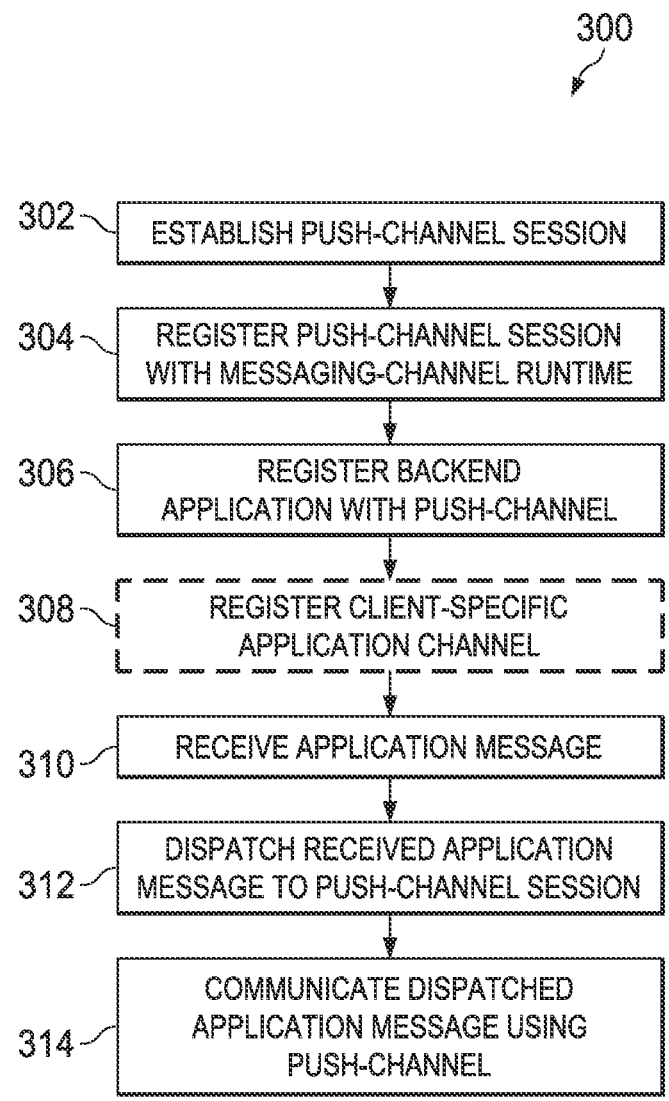
FIG. 3 is a flow chart dynamic client registration for server push events in long polling scenarios.

Turning now to FIG. 3, FIG. 3 is a flow chart 300 of dynamic client registration for server push events in long polling scenarios. For clarity of presentation, the description that follows generally describes method 300 in the context of FIGS. 1 and 2. However, it will be understood that method 300 may be performed, for example, by any other suitable system, environment, software, and hardware, or a combination of systems, environments, software, and hardware as appropriate. For example, one or more of the enterprise server, the client, or other computing device (not illustrated) can be used to execute method 300 and obtain any data from the memory of the client, the enterprise server, or the other computing device (not illustrated).

At 302, the client and enterprise server establish a push channel session. As described above, the push channel session may utilize long polling, in which case the client sends a long polling request to the enterprise server and the enterprise server creates a push channel session that holds the long polling request and associates the held long polling request with the client that sent the request. In some implementations, the push channel session may be established and maintained by a push session manager associated with the enterprise server. Alternatives to long polling may be used in various implementations.

At 304, the push session manager registers the established push channel session with a messaging channel runtime. In some implementations, the push session manager registers the established push channel session by sending to the messaging channel runtime a unique identifier associated with the client and an indication that the client has established a push session. In some implementations, the push session manager registers the established push channel session by sending an identifier for or link to a push session process or thread created by the push session manager to handle the established push channel session for the identified client.

At 306, the client registers to receive messages from one or more backend applications associated with the enterprise server. In some implementations, the client may send a request to a channel registration manager associated with the enterprise server to register with one or more backend applications. The request may include an identifier that associates the client with the push channel session and a list of one or more backend applications from which the client desires to receive messages. As described above with regard to FIGS. 1 and 2, the channel registration manager may forward the information contained in the application registration request to the push session manager and/or the messaging channel runtime.

In 308, the messaging channel runtime may optionally create a client-specific application channel for forwarding messages from the backend applications to the push channel session associated with a specific client. Where the push session manager maintains a push session process or thread for each established push channel session, for example, the messaging channel runtime may receive registration request from a specific client that desires to receive messages from a specific backend application. As a result, the messaging channel runtime may establish a communication channel between the push session process or thread associated with the specific client and the specific backend application. However, in other implementations, messaging channel runtime may be configured to act as a routing service between the backend applications and the established push channel sessions without the need for client-specific application channels.

In 310, the messaging channel runtime receives a message from a backend application. Upon receiving the message from the backend application, in 312, the messaging channel runtime may dispatch the received application message to one or more push channel sessions associated with clients that have registered to receive messages from the backend application that sent the message. In order to dispatch the message to the proper push channel sessions, the messaging channel runtime may access a table or other data structure that associates each established push channel session with those backend applications from which the client associated with the push channel session has registered to receive messages.

In 314, the push session manager communicates the application message to one or more clients using the push channel session associated with those clients that registered to receive messages from the backend application that sent the application message. Where the push channel session is implementing using long polling, the push session manager communicates the application message by responding to the long polling requests being held for those clients that registered to receive the application message. As described above with regard to FIGS. 1 and 2, the communication from the enterprise server to the client may include a copy of the message and an indication of the backend application that sent the message. The client may distribute received messages to those client applications and/or other processes that may rely upon them. Moreover, the client may maintain the push channel session with the enterprise server by renewing the long polling request as soon as the client receives a response with a message.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example Linux, UNIX, Windows, Mac OS, Android, iOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a central processing unit (CPU), a FPGA (field programmable gate array), or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the enterprise user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN), a wide area network (WAN), e.g., the Internet, and a wireless local area network (WLAN).

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method, comprising:
   establishing a push-channel session uniquely associated with a client, wherein the push channel session communicates with the client using a single push channel;
   registering the established push-channel session with a messaging channel runtime creating a client-specific messaging channel, wherein the push-channel session is established and maintained between the client and an enterprise server by a push-session manager, the push-channel session established responsive to receiving a message from the client to initiate the push-channel session, wherein the registration of the push channel session is performed on the messaging channel runtime and the push session, and wherein, prior to the registration, the push channel session receives at least one of a registration or a de-registration request for a backend application;
   registering the backend application with the push-channel-session-associated single push channel using a channel registration manager, the registration initiated by a request sent by the client to the channel registration manager;
   responsive to an application message received from an application session associated with the backend application using a client-specific application channel, dispatching the received application message to the push-channel session from the messaging channel runtime using the client-specific messaging channel; and
   communicating the dispatched application message to the client using the single push channel.

2. The computer-implemented method of claim 1, wherein the single push channel is implemented using at least one of long polling or web sockets.

3. The computer-implemented method of claim 1, further comprising, prior to receiving the application message associated with the application session, registering the client-specific application channel between the application session and the messaging channel runtime.

4. The computer-implemented method of claim 3, wherein the messaging channel runtime dispatches the received application message using the client-specific messaging channel corresponding to the client associated with the application channel.

5. The computer-implemented method of claim 1 wherein the communicated application message is dispatched by a client push dispatcher to the client application associated with the application session.

6. A computer program product, tangibly embodied in a machine-readable storage device, the computer program product being operable to cause data processing apparatus to perform operations comprising:
   establishing a push-channel session uniquely associated with a client, wherein the push channel session communicates with the client using a single push channel;
   registering the established push-channel session with a messaging channel runtime creating a client-specific messaging channel, wherein the push-channel session is established and maintained between the client and an enterprise server by a push-session manager, the push-channel session established responsive to receiving a message from the client to initiate the push-channel session, wherein the registration of the push channel session is performed on the messaging channel runtime and the push session, and wherein, prior to the registration, the push channel session receives at least one of a registration or a de-registration request for a backend application;
   register the a backend application with the push-channel-session-associated single push channel using a channel registration manager, the registration initiated by a request sent by the client to the channel registration manager;
   responsive to an application message received from an application session associated with the backend application using a client-specific application channel, dispatching the received application message to the push-channel session from the messaging channel runtime using the client-specific messaging channel; and
   communicating the dispatched application message to the client using the single push channel.

7. The computer program product of claim 6, wherein the single push channel is implemented using at least one of long polling or web sockets.

8. The computer program product of claim 6, further comprising, prior to receiving the application message associated with the application session, registering the client-specific application channel between the application session and the messaging channel runtime.

9. The computer program product of claim 8, wherein the messaging channel runtime dispatches the received application message using the client-specific messaging channel corresponding to the client associated with the application channel.

10. The computer program product of claim 6 wherein the communicated application message is dispatched by a client push dispatcher to the client application associated with the application session.

11. A system, comprising:
    memory operable to store at least one decision service; and
    at least one hardware processor interoperably coupled to the memory and configured to perform operations comprising:
    establishing a push-channel session uniquely associated with a client, wherein the push channel session communicates with the client using a single push channel;

registering the established push-channel session with a messaging channel runtime creating a client-specific messaging channel, wherein the push-channel session is established and maintained between the client and an enterprise server by a push-session manager, the push-channel session established responsive to receiving a message from the client to initiate the push-channel session, wherein the registration of the push channel session is performed on the messaging channel runtime and the push session, and wherein, prior to the registration, the push channel session receives at least one of a registration or a de-registration request for a backend application;

registering the backend application with the push-channel-session-associated single push channel using a channel registration manager, the registration initiated by a request sent by the client to the channel registration manager;

responsive to an application message received from an application session associated with the backend application using a client-specific application channel, dispatching the received application message to the push-channel session from the messaging channel runtime using the client-specific messaging channel; and communicating the dispatched application message to the client using the single push channel.

12. The system of claim 11, wherein the single push channel is implemented using at least one of long polling or web sockets.

13. The system of claim 11, wherein the at least one hardware processor is further configured to perform operations comprising: prior to receiving the application message associated with the application session, registering the client-specific application channel between the application session and the messaging channel runtime.

14. The system of claim 13, wherein the messaging channel runtime dispatches the received application message using the client-specific messaging channel corresponding to the client associated with the application channel.

15. A computer-implemented method, comprising:

establishing a push-channel session uniquely associated with a client, wherein the push channel session communicates with the client using a single push channel;

registering the established push-channel session with a messaging channel runtime creating a client-specific messaging channel, wherein the push-channel session is established and maintained between the client and an enterprise server by a push-session manager, the push-channel session established responsive to receiving a message from the client to initiate the push-channel session;

registering a backend application with the push-channel-session-associated single push channel using a channel registration manager, the registration initiated by a request sent by the client to the channel registration manager;

responsive to an application message received from an application session associated with the backend application using a client-specific application channel, dispatching the received application message to the push-channel session from the messaging channel runtime using the client-specific messaging channel, wherein prior to receiving the application message associated with the application session, the client-specific application channel between the application session and the messaging channel runtime is registered, and wherein the messaging channel runtime dispatches the received application message using the client-specific messaging channel corresponding to the client associated with the client-specific application channel; and communicating the dispatched application message to the client using the single push channel.

16. The computer-implemented method of claim 15, wherein the registration of the push channel session is performed on the messaging channel runtime and the push session.

17. The computer-implemented method of claim 16, wherein, prior to the registration, the push channel session receives at least one of a registration or a de-registration request for the backend application.

18. A computer program product, tangibly embodied in a machine-readable storage device, the computer program product being operable to cause data processing apparatus to perform operations comprising:

establishing a push-channel session uniquely associated with a client, wherein the push channel session communicates with the client using a single push channel;

registering the established push-channel session with a messaging channel runtime creating a client-specific messaging channel, wherein the push-channel session is established and maintained between the client and an enterprise server by a push-session manager, the push-channel session established responsive to receiving a message from the client to initiate the push-channel session;

registering a backend application with the push-channel-session-associated single push channel using a channel registration manager, the registration initiated by a request sent by the client to the channel registration manager;

responsive to an application message received from an application session associated with the backend application using a client-specific application channel, dispatching the received application message to the push-channel session from the messaging channel runtime using the client-specific messaging channel, wherein prior to receiving the application message associated with the application session, the client-specific application channel between the application session and the messaging channel runtime is registered, and wherein the messaging channel runtime dispatches the received application message using the client-specific messaging channel corresponding to the client associated with the client-specific application channel; and communicating the dispatched application message to the client using the single push channel.

19. The computer program product of claim 18, wherein the registration of the push channel session is performed on the messaging channel runtime and the push session.

20. The computer program product of claim 19, wherein, prior to the registration, the push channel session receives at least one of a registration or a de-registration request for the backend application.

21. A system, comprising:

memory operable to store at least one decision service; and at least one hardware processor interoperably coupled to the memory and configured to perform operations comprising:

establishing a push-channel session uniquely associated with a client, wherein the push channel session communicates with the client using a single push channel;

registering the established push-channel session with a messaging channel runtime creating a client-specific messaging channel, wherein the push-channel session is established and maintained between the client and an enterprise server by a push-session manager, the push-channel session established responsive to receiving a message from the client to initiate the push-channel session;

registering a backend application with the push-channel-session-associated single push channel using a channel registration manager, the registration initiated by a request sent by the client to the channel registration manager;

responsive to an application message received from an application session associated with the backend application using a client-specific application channel, dispatching the received application message to the push-channel session from the messaging channel runtime using the client-specific messaging channel, wherein prior to receiving the application message associated with the application session, the client-specific application channel between the application session and the messaging channel runtime is registered, and wherein the messaging channel runtime dispatches the received application message using the client-specific messaging channel corresponding to the client associated with the client-specific application channel; and communicating the dispatched application message to the client using the single push channel.

22. The system of claim 21, wherein the registration of the push channel session is performed on the messaging channel runtime and the push session.

23. The system of claim 22, wherein, prior to the registration, the push channel session receives at least one of a registration or a de-registration request for the backend application.

* * * * *